US009731304B2

(12) United States Patent
Paris (10) Patent No.: US 9,731,304 B2
(45) Date of Patent: Aug. 15, 2017

(54) APPARATUS FOR COATING PARTICULATE MATERIAL FLOWING THROUGH A CHUTE

(71) Applicant: James L. Paris, Ludington, MI (US)

(72) Inventor: James L. Paris, Ludington, MI (US)

( * ) Notice: Subject to any disclaimer, the term of this patent is extended or adjusted under 35 U.S.C. 154(b) by 278 days.

(21) Appl. No.: 14/567,597

(22) Filed: Dec. 11, 2014

(65) Prior Publication Data

US 2016/0167067 A1   Jun. 16, 2016

(51) Int. Cl.
| | | |
|---|---|---|
| *B05B 1/20* | (2006.01) | |
| *B01J 2/16* | (2006.01) | |
| *B05B 13/02* | (2006.01) | |
| *A01C 1/06* | (2006.01) | |
| *A23K 40/30* | (2016.01) | |
| *B01F 5/20* | (2006.01) | |
| *B01F 5/24* | (2006.01) | |
| *B65G 69/18* | (2006.01) | |
| *B01J 2/00* | (2006.01) | |
| *B05B 15/04* | (2006.01) | |
| *B05B 7/14* | (2006.01) | |

(52) U.S. Cl.
CPC ............... *B05B 1/202* (2013.01); *A01C 1/06* (2013.01); *A23K 40/30* (2016.05); *B01F 5/205* (2013.01); *B01F 5/246* (2013.01); *B01J 2/006* (2013.01); *B01J 2/16* (2013.01); *B05B 13/025* (2013.01); *B05B 15/0443* (2013.01); *B65G 69/188* (2013.01); *B05B 7/14* (2013.01)

(58) Field of Classification Search
CPC . B01J 2/16; B05B 13/025; A01C 1/06; A23K 40/30; B01F 5/205; B01F 5/246; B65G 11/088; B65G 69/188
See application file for complete search history.

(56) References Cited

U.S. PATENT DOCUMENTS

| | | | | |
|---|---|---|---|---|
| 2,955,956 A | * | 10/1960 | Baugh ..................... | B01F 5/221 118/303 |
| 3,879,021 A | * | 4/1975 | Riley ..................... | B01F 5/205 366/137.1 |
| 3,991,225 A | * | 11/1976 | Blouin .................... | A61K 9/28 23/293 A |
| 4,116,163 A | | 9/1978 | Torelli | |
| 4,171,165 A | * | 10/1979 | Card ........................ | B01F 7/08 222/236 |
| 4,353,852 A | | 10/1982 | Tse | |
| 4,369,689 A | | 1/1983 | Donaghue | |
| 4,478,171 A | | 10/1984 | Bridges | |
| 4,507,335 A | | 3/1985 | Mathur | |
| 4,610,218 A | | 9/1986 | Johnson | |

(Continued)

FOREIGN PATENT DOCUMENTS

WO          9707879          3/1997

*Primary Examiner* — Karl Kurple
(74) *Attorney, Agent, or Firm* — Mitchell Intellectual Property Law, PLLC (57) ABSTRACT

An injector head for delivering particulate material from a feeder source to a receiver is fitted with a plurality of splitter bars extending generally laterally from the sidewalls thereof into the space through which particulate material is fed as it flows into a receiver. Spray nozzles mounted to said sidewalls below said splitter bars spray coating material generally laterally relative to said sidewalls and generally laterally relative to the length of said splitter bars so as to coat particulate material as it passes over and to the sides and ends of said splitter bars.

36 Claims, 9 Drawing Sheets

(56) References Cited

U.S. PATENT DOCUMENTS

| | | | |
|---|---|---|---|
| 4,661,365 A | | 4/1987 | Malone |
| 4,686,115 A | | 8/1987 | Majer |
| 4,842,790 A | | 6/1989 | Nunnelly |
| 4,886,011 A | * | 12/1989 | Gelain .................... B01J 2/006 |
| | | | 118/308 |
| 4,921,674 A | | 5/1990 | Enos |
| 5,210,962 A | * | 5/1993 | Jones, Jr. ............... B01J 8/0035 |
| | | | 209/244 |
| 5,435,945 A | | 7/1995 | De Paoli |
| 5,437,889 A | | 8/1995 | Jones |
| 5,447,565 A | * | 9/1995 | Song .................... A23G 3/2076 |
| | | | 118/17 |
| 5,993,903 A | * | 11/1999 | Toepfer .................... A01C 1/06 |
| | | | 118/303 |
| 6,026,591 A | * | 2/2000 | Zimmerman ....... F26B 17/1408 |
| | | | 34/175 |
| 6,106,753 A | | 8/2000 | Redd |
| 6,340,394 B1 | | 1/2002 | Cook |
| 6,451,115 B1 | | 9/2002 | Wilson |
| 6,485,569 B1 | * | 11/2002 | Sarakas .................... B01J 2/006 |
| | | | 118/24 |
| 6,656,525 B2 | * | 12/2003 | Rae ...................... B05B 13/025 |
| | | | 118/19 |
| 2004/0116316 A1 | * | 6/2004 | Michel .................... B01J 2/006 |
| | | | 510/444 |
| 2005/0169613 A1 | * | 8/2005 | Merrell ............... F26B 17/1416 |
| | | | 392/386 |
| 2006/0162649 A1 | * | 7/2006 | Fellinger ............... B05B 7/1422 |
| | | | 118/300 |
| 2007/0196573 A1 | * | 8/2007 | Nevin .................... B01J 2/006 |
| | | | 427/212 |
| 2016/0166969 A1 | * | 6/2016 | Pellizzari ............... B01D 47/06 |
| | | | 261/23.1 |

* cited by examiner

APPARATUS FOR COATING PARTICULATE MATERIAL FLOWING THROUGH A CHUTE

FIELD OF THE INVENTION

The present invention relates to the field of coating particles, and in a preferred embodiment, to coating particles of sand with dust suppressant.

BACKGROUND

Particles of material are coated for various reasons. Sand for use in fracking and the like is coated with dust suppressant. Sand used for fracking is coated by spraying it with a dust suppressant as it is conveyed over the end of a conveyor and into a waiting truck.

Other materials are often coated in rotating drums called tumblers, in which particles are sprayed with coating solutions as they cascade off of baffles located in the tumbler. See e.g. U.S. Pat. Nos. 4,478,171 and 3,991,225. Agglomerators in which particles are agglomerated by spraying with water or an agglomerating solution are similar. See e.g. U.S. Pat. Nos. 4,507,335 and 4,353,852.

In U.S. Pat. No. 4,921,674, seeds are sprayed with chemicals by laterally directed nozzles as they cascade over baffles in a tower. In U.S. Pat. Nos. 4,369,689 and 6,106,753, particles are coated by downwardly directed nozzles as they fall through a delivery chute. In '689, a cone shaped baffle is positioned above the downwardly directed nozzle.

SUMMARY OF THE INVENTION

In the present invention, an injector head for delivering particulate material from a feeder source to a receiver is fitted with a plurality of splitter bars extending generally laterally from the sidewalls thereof into the space through which particulate material is fed as it flows into a receiver. Spray nozzles mounted to said sidewalls below said splitter bars spray coating material generally laterally relative to said sidewalls and generally laterally relative to the length of said splitter bars so as to coat particulate material as it passes over and to the sides and ends of said splitter bars.

Employing plural splitter bars and associated sprayers increases the surface area of the particles which are exposed to the coating spray. The result is a generally uniform coating on said particulate material as it reaches its intended receiver. These and other objects, advantages and features of the invention will he more frilly understood and appreciated by reference to the Description of the Preferred Embodiments and appended drawings.

DESCRIPTION OF THE PREFERRED EMBODIMENTS

Figure 1:
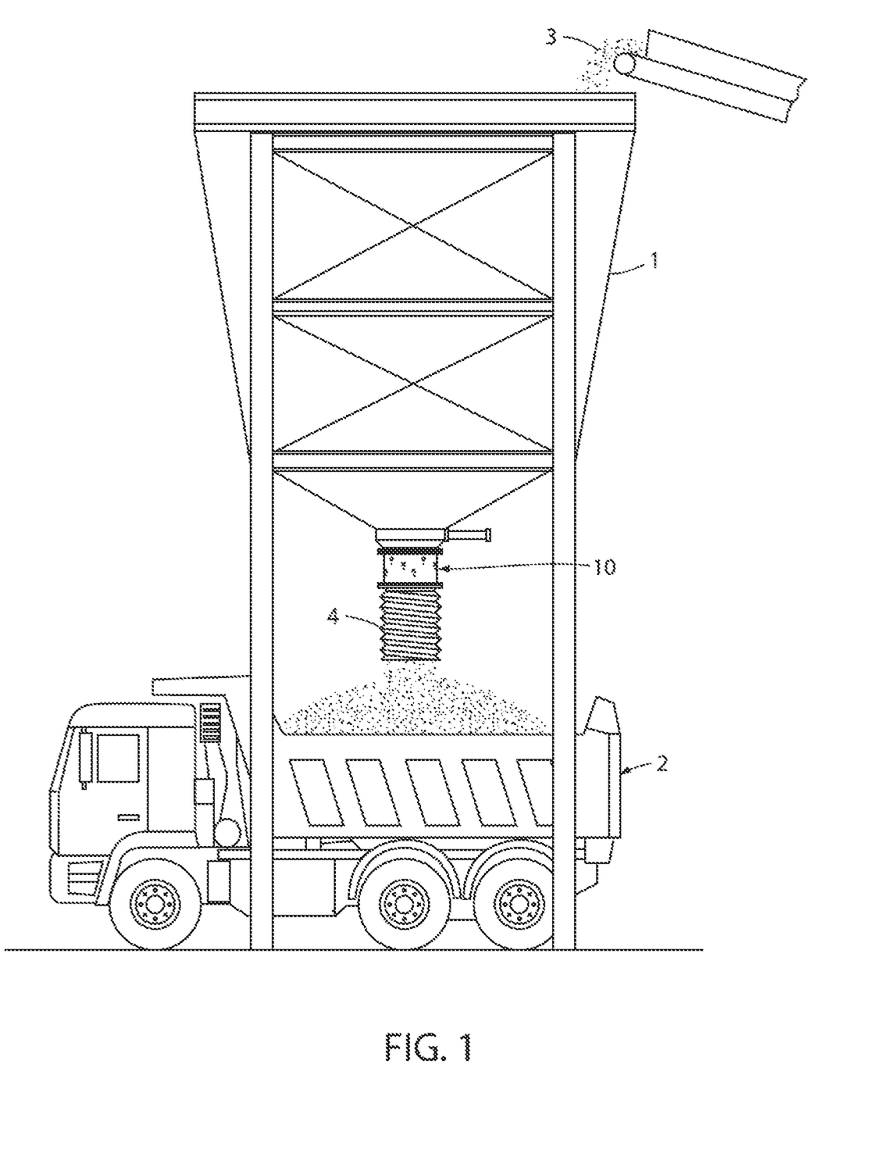
FIG. 1 shows particulate matter flowing from a delivery source through an injector head and into a receiver, which as shown is a waiting truck.
Figure 2:
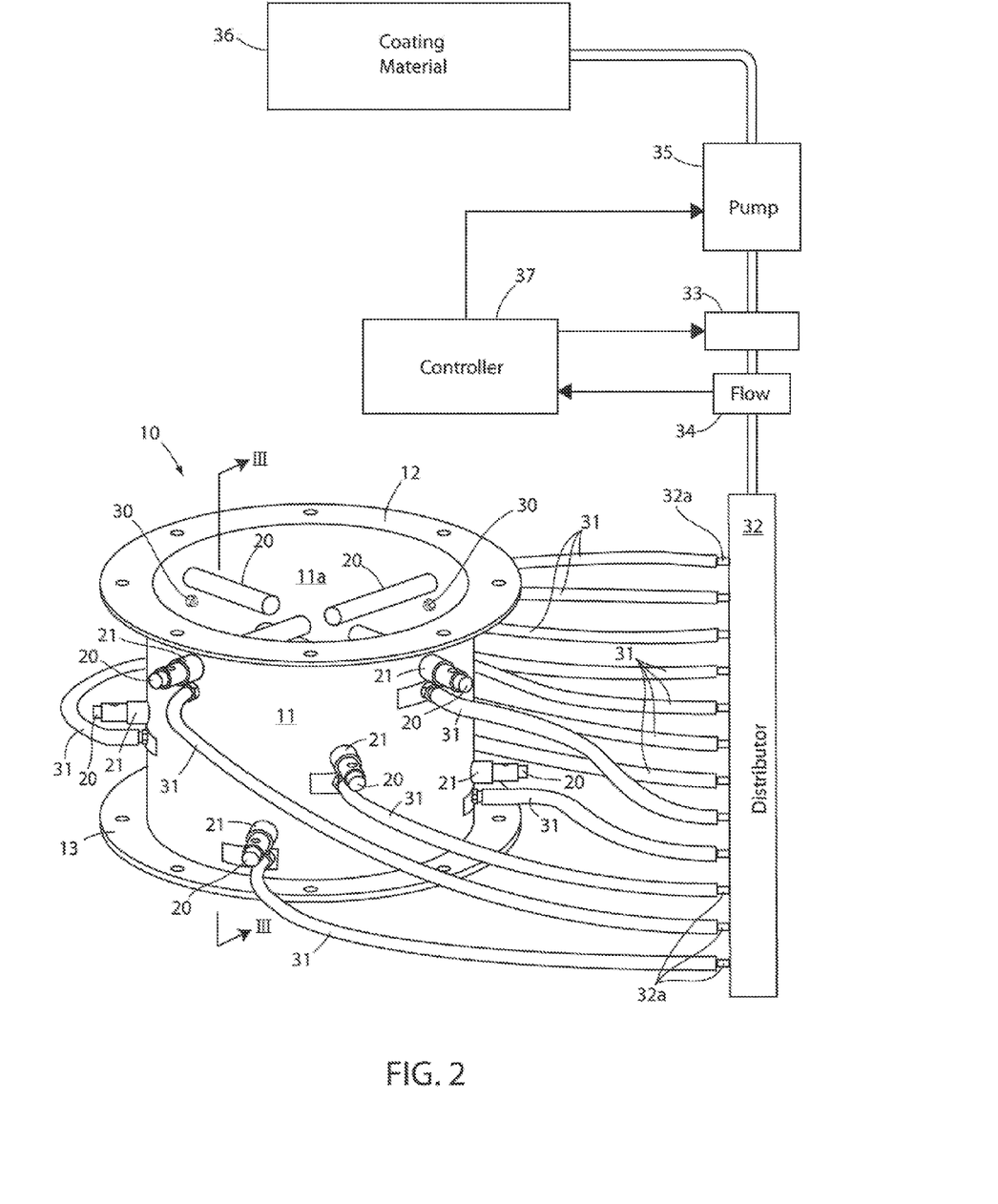
FIG. 2 is a perspective view of an injector head, including a schematic showing of the coating control and delivery system.
Figure 3:
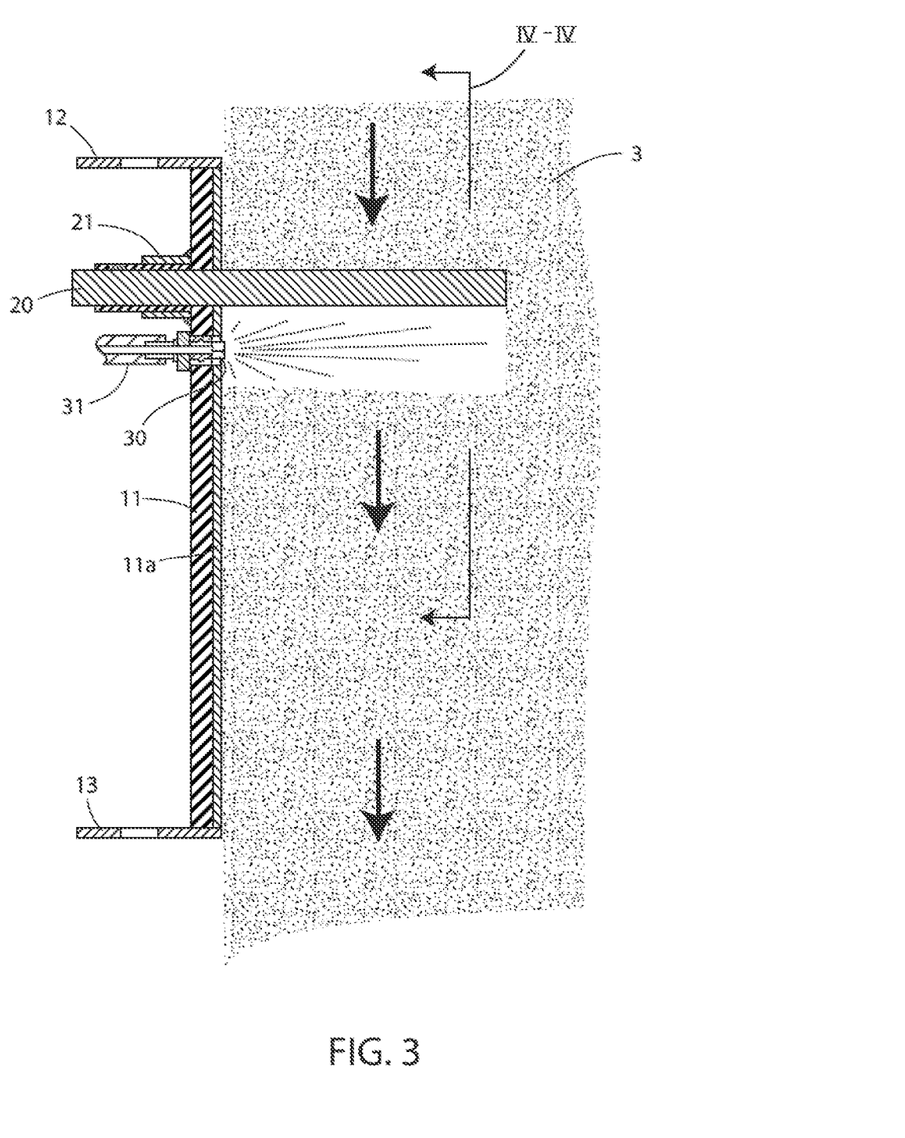
FIG. 3 is a cross section taken on plane III-III in FIG. 1.
Figure 4:
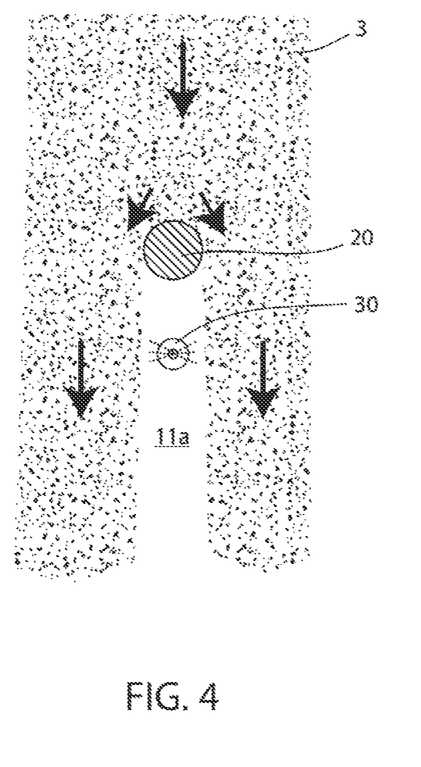
FIG. 4 is a cross section taken along plane IV-IV of FIG. 3.

In the preferred embodiment, particles of particulate material 3 pass from a source of delivery, such as hopper 1, to a receiver such as truck 2 through a relatively small injector head 10, in which the particles 3 are coated (FIG. 1). A plurality of splitter bars 20 extend inwardly from the sidewalls 11 of injector 10, and a spray nozzle 30 mounted on sidewall 11 is positioned below each splitter bar 20 (FIG. 2). Splitter bars 20 divide the flow of particulate material such that it flows past either side of and past the end of each splitter bar 20 (FIG. 4). This opens a space in the particulate material below splitter bar 20, allowing each spray nozzle 30 to spray the particulate matter passing by it on either side and over the end of splitter bar 20. (FIGS. 3 and 4). The provision of a plurality of such splitter bars 20 and associate spray nozzles 30 increases the surface area of particulate material which is exposed to the coating spray.

Injector head 10 can be relatively short, e.g. one foot long (FIG. 2). Preferably it is from about 4 inches to about 48 inches in length, most preferably about one foot in length. In addition to providing a space in which particulate material 3 is coated, injector head 10 serves as a chute through which the particulate material 3 being delivered from a delivery source 1 to a receiver 2. To that end, injector head 10 is entirely open at both top and bottom. To that end, injector head 10 is sized in cross section to a size appropriate to function as a chute for particulate material. Preferably, it has a diameter, width or length, of about 6 to 24 inches, preferably 10 to 20 inches and most preferably about 14 to 16 inches. The ultimate diameter will in part be a function of the volume of particulate material which one wants to feed in a given amount of time.

The continual flow of particulate matter down through the chute defined by injector head 10 eliminates open head space above the particles being coated. In coaters with head space, dust and spray above the particles being coated tend to agglomerate in chimps on the exposed walls of the head space and then fall off in and contaminate the coated particulate matter. The continual flow of particulate matter through the coating zone defined by the injector head tend to clean the sidewall(s) 11 and the splitter bars 20 of incipient chimps of agglomerated particles and coating material. In essence, the preferred embodiment injector head 10 is designed to be self-cleaning.

It is preferable that injector head 10 be a separate unit which can be attached to any feeder source, or to a chute projecting from the feeder source (FIG. 1). However in broader aspects of the preferred embodiments, injector head 10 can be that portion of the chute extending from a feeder in which the splitter bars 20 and spray nozzles 30 are located.

As shown in FIGS. 1 and 2, injector head 10 is cylindrical in configuration and thus comprises one cylindrical sidewall 11. While the cylindrical configuration is preferred, injector head 10 can take other shapes such as square, pentagonal, hexagonal, octagonal, etc. In the preferred embodiment injector 10 includes a top mounting flange 12 and a bottom mounting flange 13. Top flange 12 allows connection of injector 10 to a delivery source such as hopper 2, or to a chute extending therefrom, and bottom flange 13 allows connection of a delivery chute extension 4 to injector head 10 (FIG. 1). Injector head 10 is made of a heavy duty material such as steel, and preferably, sidewall(s) 11 is coated with a wear resistant ⅛ inch metallized or wear resistant polymer layer.

Figure 5:
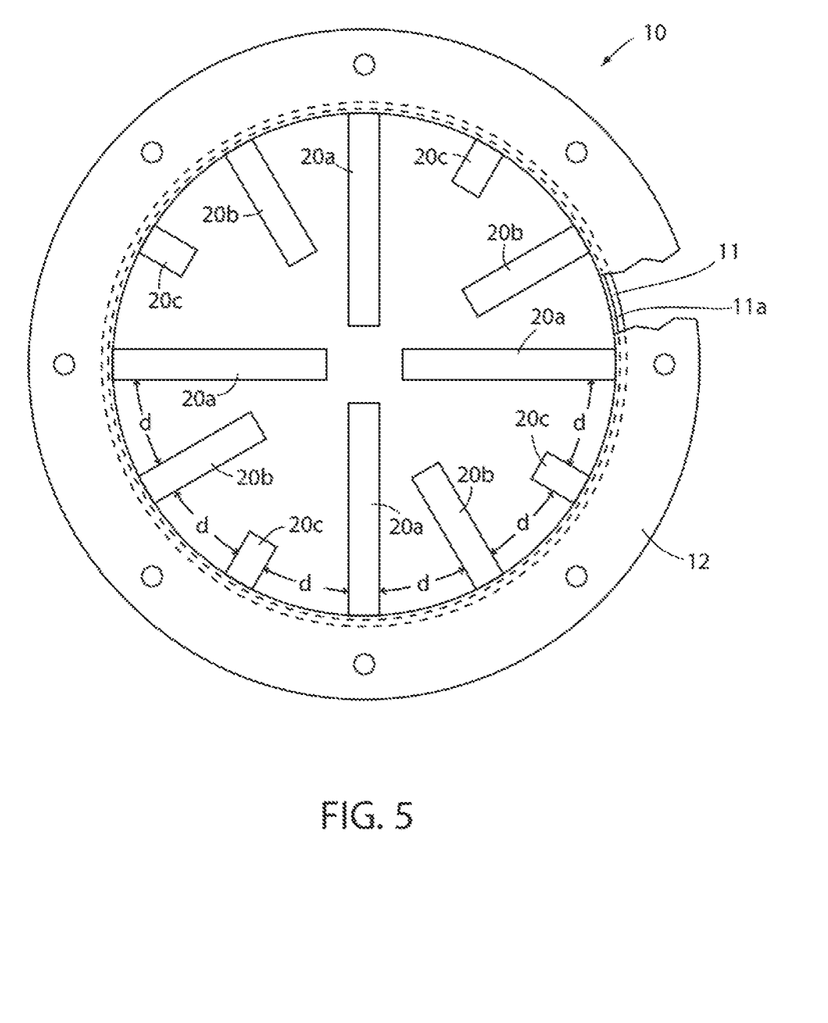
FIG. 5 is a top plan view of an injector head.

Splitter bars 20 project generally laterally from sidewall 11 into the interior of injector head 10. Preferably, different splitter bars or different sets of splitter bars project inwardly from sidewall(s) 11 to different distances (FIG. 5). This prevents particulate matter which passes over the ends of splitter bars 20 from becoming too heavily coated in the central portion of the passing particulate material 3. As shown in FIG. 5, there are three sets of four splitter bars 20$a$, 20$b$ and 20$c$. Splitter bars 20$a$ are the longest, extending almost to the middle of injector head 10. The longest splitter bars 20$a$ preferably extend to about the centerline of injector head 10, or more preferably to about ½ to 1 inch from the centerline. Splitter bars 20$c$ are the shortest, and splitter bars 20$b$ are of intermediate length. The shortest bars 20$c$ must be sufficiently long to cover spray nozzles 30 positioned under them and preferably a bit longer. Preferably the shortest bars 20$c$ extend inwardly from sidewall 11 about 1 to 3 inches, most preferably about 2 inches. Also preferably, the difference in length between sets of splitter bars is about 1 to 3 inches, most preferably about 2 inches. In the preferred embodiment shown in FIG. 5, injector head 10 is about 14 inches in diameter. Splitter bars 20$c$ project inwardly about 2 inches, splitter bars 20$b$ project inwardly about 4 inches, and splitter bars 20$a$ project inwardly about 6 inches.

Splitter bars 20 are also preferably mounted at different levels within injector head 10 (FIG. 2), staggered relative to one another such that preferably, no splitter bar 20 is located directly above or directly below another splitter bar 20. This avoids congestion and over exposure of portions of the particulate matter to coating material. As shown in FIG. 1, there are three levels of splitter bars 20. Preferably at least some of the longest splitter bars 20$a$ are located near the top of injector head 10, and at least some of the shortest are located near the bottom of injector head 10. The entire set 20$a$ could be located at the top, intermediate set 20$b$ at and intermediate level, and the shortest set 20$c$ near the bottom. Another exemplary arrangement would employ two splitter bars 20$a$ and two splitter bars 20$b$ at the top, two splitter bars 20$a$, one 20$b$ and one 20$c$ at the intermediate level, and three 20$c$ and one 20$b$ near the bottom. The number of different lengths of splitter bars 20 will be a function of the diameter or width of injector head 10. Using 2 inches as the difference in length, a fourth set of splitter bars at a length of 8 inches would have to be used in an injector head Which is 17 or 18 inches in diameter.

The number of splitter bars used also varies as a function of the diameter or width of injector bead 10, and the distance "d" between adjacent splitter bars 20 in vertical plan view (FIG. 5). Spacing is designed to give maximum even coverage to the particulate material. passing through injector head 10. Preferably, no particles pass through injector head 10 at a distance of more than about 2 inches from a splitter bar 20. Preferably, the plan view separation "d" between adjacent splitter bars 20 at their bases where they extend from sidewall(s) 11 is from about 1 to 4 inches, more preferably 1 to 3 inches, and most preferably about 2½ inches. Thus. even if splitter bars 20$a$, 20$b$ and 70$c$ are mounted at different levels, the distance between a splitter bar 20$a$ and an adjacent splitter bar 20$b$ in vertical plan view, is most preferably about 2½ inches. For example the spacing between splitter bars 20$a$ all mounted at the top level would be about 6 to 8 inches, but the vertical plan view distance between a splitter bar 20$a$ at the top level and a plan view adjacent splitter bar 20$b$ at the next level down would be about 2 to 2½ inches, and the distance to a splitter bar 20$c$ adjacent to it in plan view on its other side and mounted at the lowest level would be about 2 to 2½ inches.

Figure 6:
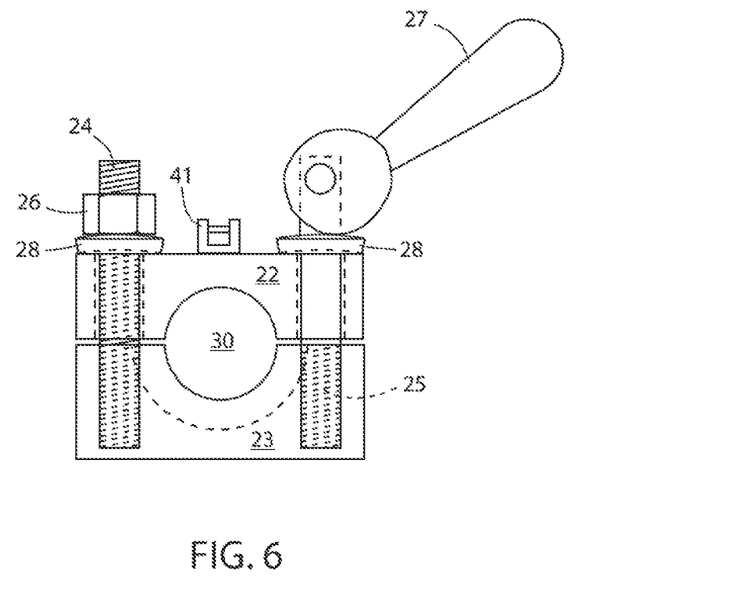
FIG. 6 is a front elevation a releasable clamping mount for a splitter bar.
Figure 7:
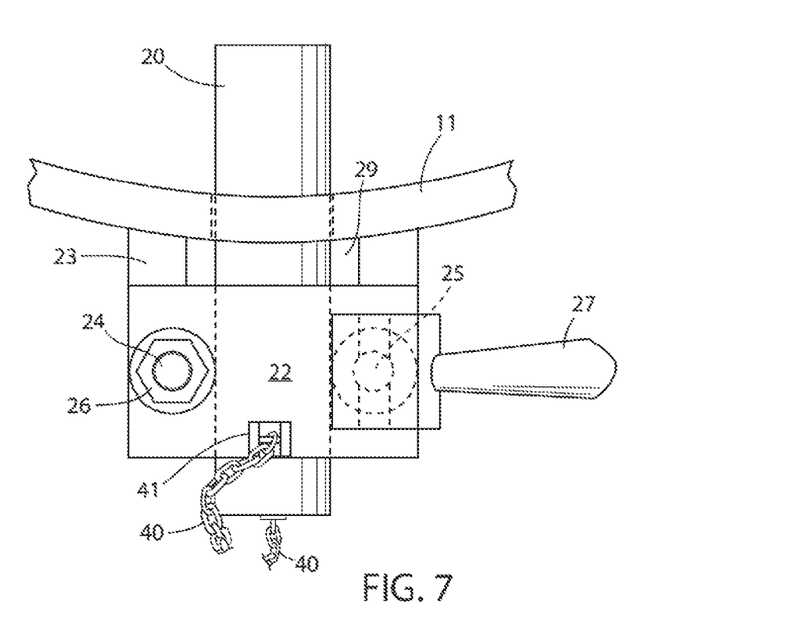
FIG. 7 is a plan view of a releasable clamping mount for a splitter bar.

In cross section, splitter bars 20 can be of circular, square, rectangular, polygonal, or semi-circular. However preferably, they are circular or semi-circular with the semi-circular side facing upward (FIGS. 2, 6 and 7). This keeps particulate matter from building up on top of the bars. The diameter or lateral width of splitter bars 20 is preferably sufficient to create a space between the spaced curtains of particles flowing over splitter bar 20 to be sprayed throughout the width of the passing curtains. Yet, one should avoid making the splitter bars so wide that they create a head space surface on their bottom which will provide a surface for clumps to agglomerate and eventually drop off and foul the final coated particulate product. Preferably, the diameter or width of the splitter bars is from about ½ to about 1½ inches, more preferably about ¾ to about 1¼ inch, and most preferably about 1 inch. Splitter bars 20 are preferably made of hardened alloy steel or other hard material to resist wear.

A Spray nozzle 30 is located immediately below each splitter bar 20, and sprays coating material in small droplets, preferably as fine mist (FIGS. 2, 3 and 4). It is positioned as distance sufficient to minimize the extent to which coating material is inadvertently sprayed onto the underside of splitter bar 20, but not so far below that it is located at or below the point at which the split curtains of flowing particles reunite, which would prevent the spray nozzle from spraying the full width of the curtains of passing particulate material. Since successive levels of offset splitter bars tend to force separated curtains to reunite, the vertical spacing of a nozzle 30 below its splitter bar 20 is a function to some extent of the distance between adjacent levels of splitter bars 20. Preferably, spray nozzles 30 are located from about ½ inch to about 6 inches below, most preferably about 1 to 1½ inch below their associated splitter bars 20. (FIGS. 2-4) Spray nozzles 30 spray generally laterally inwardly into injector head 10, that is, generally along a plane passing laterally through injector head 10. In addition, nozzles 30 spray laterally outwardly away from the sides of splitter bar 20, into the space on either side of and below its covering splitter bar 20. Spray nozzles 30 are preferably of the wide fan-type spray nozzle.

Preferably, spray nozzles 30 spray in an arc sufficient to spray as much as possible of the particulate material passing by it to either side of splitter bar 20, without also spraying coating material onto the sidewall(s) of injector head 10. Preferably, the arc of the spray encompasses from about 70 to 110°, preferably about 80 to 100°, and most preferably from about 90°. However in an injector head 10 having a square configuration, one might be able to use a wider arc, especially from a nozzle 30 located in the middle of a sidewall, than one can use in a cylindrically shaped injector head.

Preferably, airless spray is employed. Coating material from source 36 is pumped by pump 35 to distributor 32, past an on-off valve 33 and a flow meter 34 (FIG. 2). Preferably the coating material is fed to nozzles 30 under an appropriate operational pressure of from about 50 to 2000 psi, more preferably about 300 to 400 psi, through conduits 31. Viscosity of the coating material used and the pressure required vary proportionally. A controller 37 is used to open or close valve 33. An operator may choose to turn off the coating system by closing valve 33, if the particulate material being fed through injector head 10 is not to he coated. If an air operated pump is used, simply closing valve 33 will effectively turn off pump 35. However, it may be advantageous to use a variable DC drive pump 35 and a flow meter 34, such that the flow rate of coating material to distributor 32 can be controlled by controlling the rate at which pump 35 operates. In such a control system pump 35 will be turned off by controller 37 simultaneously with closing valve 33.

In one preferred embodiment, splitter bars 20 are all of the same length, and are slidably mounted in splitter bar holders 21 so that the distance to which they extend into injector head 10 can be adjusted (FIGS. 6 and 7). In this embodiment, the holders 21 for the splitter bars 20 have clamping members 22 and 23. Bottom clamping member 23 is welded or otherwise secured to the exterior of sidewall 11. Clamping bolts 24 and 25 are threaded into bottom clamp 23, and extend through holes in top clamp 22. A nut 26 is threaded on bolt 24 over a spring washer 28 to hold top clamp member 22 fairly tight against bottom member 23. However the top of bolt 25 is fitted with a clamping handle 27 which is cammed over center such that it can close against a spring washer 28 on bolt 25, thereby clamping members 22 and 23 tightly against one another, or it can be rotated upwardly to loosen them to allow adjustment of the length of splitter bar 20. A sealing washer 29 of felt or elastomeric polymer or the like is fitted on splitter bar 10 between clamping members 22 and 23 and sidewall 11 in order to prevent particulate material or sprayed coating material from seeping out into the external environment.

In the slidably adjustable splitter bar embodiment, all of the splitter bars can be moved outwardly to the point that only a stub of sufficient length to protect the spray nozzle 30 remains within the injector head 10. The advantage of this is that if coating is not desired for a given load of particulate material delivered through injector head 10, or for several days of operation, the splitter bars can be moved entirely out of the way, except for the stub length sufficient to protect the nozzles from wear by the particulate material. The stub length will typically be about ¾ inch.

The extent to which each splitter bar is adjusted to project into injector head 10 can be controlled by an adjustment chain 40 secured at one end to the top of clamping member 22 and at the other end to the outer end of splitter bar 10 (FIG. 7). A yoke 41 is also mounted on top of clamping member 22. By placing, any of the links of the chain 40 in yoke 41, one can shorten the effective length of chain 40 to the end of splitter bar 10. This limits the extent to which splitter bar 10 can be slid into injector head 10. One can know the length to which a splitter bar can be inserted by counting the links, or perhaps marking particular links at different lengths.

Figure 8:
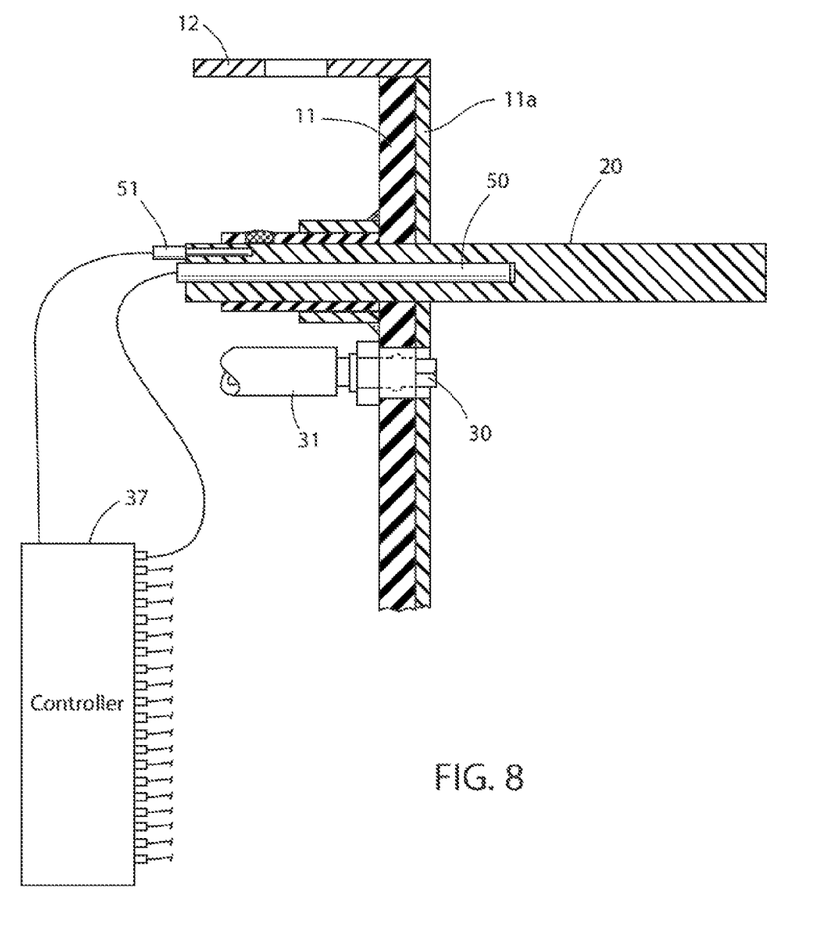
FIG. 8 is a longitudinal cross section of a splitter bar fitted with a heating cartridge.

In another embodiment, splitter bars 20 are preferably heated (FIG. 8). This option helps to keep some of the high melting point dust suppressants from sticking to the underside of the splitter bars, which can especially be a. problem when the particulate matter 3, e.g. sand, in the hopper or silo 1 is cold. In the winter time, sand may cool off considerably during extended shut downs and weekends. The sand can cool off below the melting point of some dust suppressants an literally make the splitter bars cold enough that the dust suppressant could start solidifying on the bottom side of the splitter bars and cause uneven or erratic distribution from the nozzles. One way to effect heating of the splitter bars 20 is to bore ¼ inch holes axially in the splitter bars from the outside ends to a depth of about 4 inches, to accommodate cartridge heaters 50. The cartridge heaters can be safely set to temps up to 250° F. but 110-120 would be acceptable for most high melting point dust suppressants. Only one cartridge heater needs to have a thermocouple 51 on it or associated with it, whereby a temperature controller feeds power to all the heaters 50 on splitter bars 20 the same. Control of heaters 50 is effected through controller 37. Using the cartridge heaters 50 at higher temperatures during normal injection of dust suppressant can also help evaporate the liquid dust suppressant that can accumulate and drip from the bottom of the splitter bars both during operation and after the injector head is shut off to minimize the dust suppressant from chipping off the bottom of the bars and into the truck or railcar below.

Figure 9:
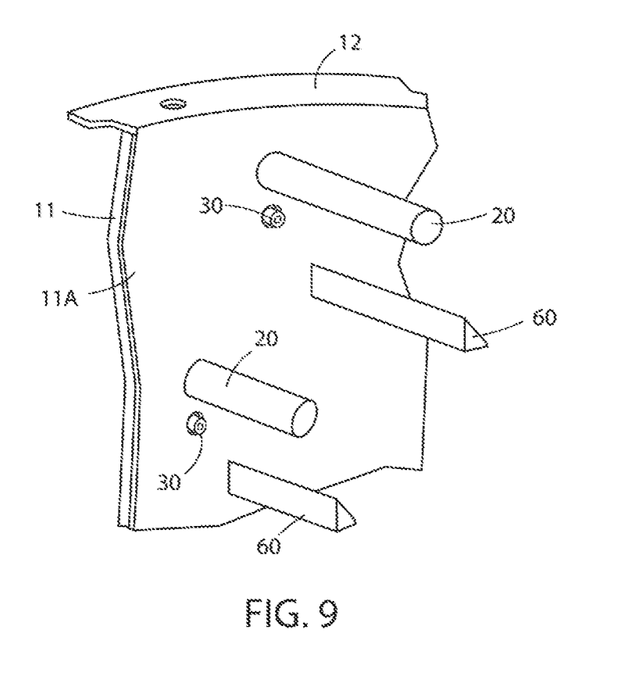
FIG. 9 is a broken view of an injector head fitted with mixing bars as well as splitter bars.
Figure 10:
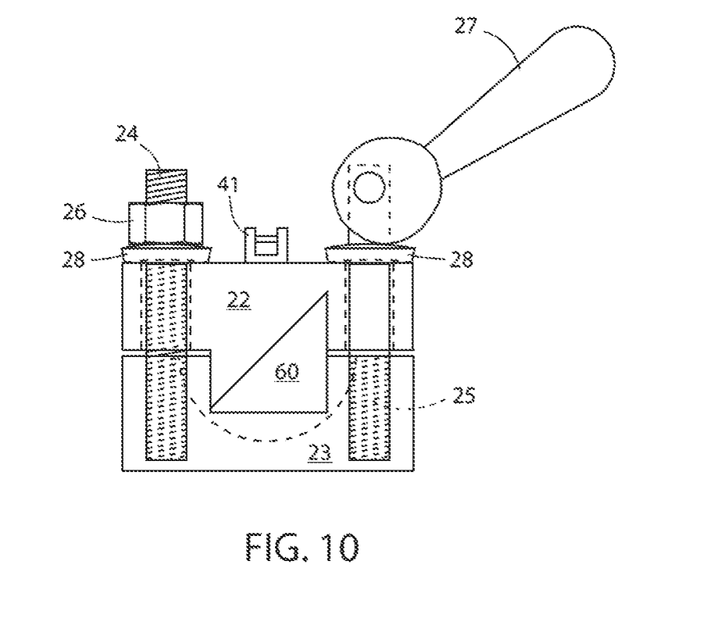
FIG. 10 shows a mixing bar mounted in a holder.

As the particulate matter continues to flow through and beyond injector head 10, coated particles will engage uncoated particles and coating material will be transferred to uncoated particles and thus cause them to be coated as well. In one embodiment, mixing bars 60 project inwardly from sidewall(s) 11 at a level located below the level of splitter bars 20 and nozzles 30 in order to cause further mixing and transfer of coating material from coated to uncoated or less coated particles (FIG. 9). Uniformity of coating is thus enhanced. Mixing bars 60 are mounted in the same type of holders 21 as splitter bars 20 are mounted (FIG. 10). Where there are multiple levels of splitter bars 20, mixing bars 60 can all be located at a level or levels below all of the levels of splitter bars 20. However, mixing bars can also be interposed between different levels of splitter bars. Thus, one or more mixing bars can be located below a level of splitter bars and nozzles, and above a subsequently lower level of splitter bars and nozzles (FIG. 9).

Preferably, mixing bars 60 are configured in cross section to provide a top surface 61 which slopes from one side of the bar towards the other (FIG. 9). The slope is from about 30-60° relative to a lateral plane through injector head 10, most preferably about 45°. Also preferably, all of the bars in one level slope in the same direction. This causes the particles passing over mixing bars 60 to flow in a spiraling or vortex manner. This creates a centrifugal force, forcing particles outwardly toward engagement with sidewall 11, and thus further enhances mixing. Mixing bars 60 at a lower level may face the same direction to further enhance the spiraling or vortex action, but may also be oriented in the opposite direction to reverse the spiral or vortex.

Figure 11:
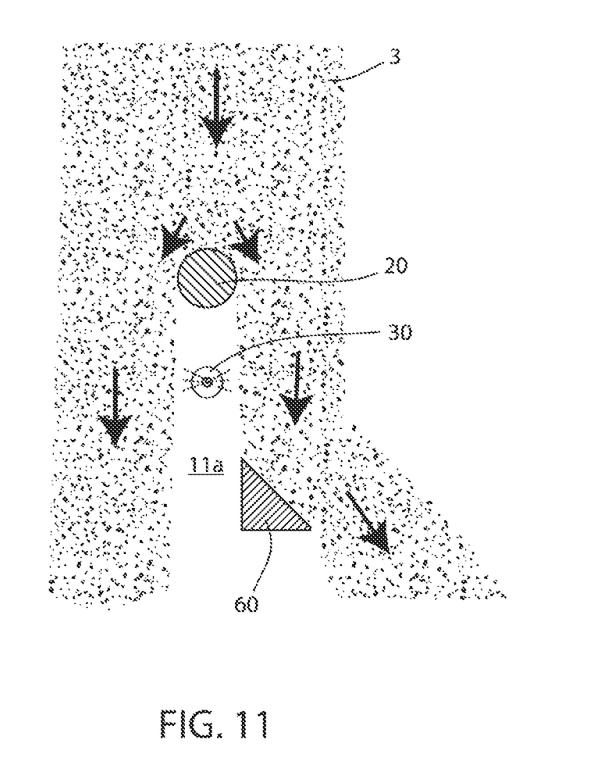
FIG. 11 shows a mixing bar located so as to divert only one of the curtains of particulate material passing the splitter bar located above it.

Preferably, each mixing bar is located just slightly off of center with respect to the splitter bar 20 located above it (FIG. 11). In this way, only one side of split flow of particles is diverted by the mixing bar 60, leaving the curtain of particles which pass on the other side of the splitter bar 20 to be mixed with the material spiraling it its direction from the action of the next adjacent mixing bar 60.

As can be seen in FIGS. 3 and 4, each splitter bar 20 separates the flowing particulate matter 3, protects spray nozzle 30 from wear, and also allows the fan spray of spray nozzle 30 to coat particles flowing past on either side of, and at the end of splitter bar 20. The coating material used will vary with the purpose of the coating and the particulate material being coated. In the case of sand, the dust suppressant coatings used typically comprise any of varying types of high flash point hydrocarbons, such as paraffins, vegetable oils, mineral oils, or water based gels. Usually about 1 pound of coating material is used to coat 1,000 pounds of sand. As shown in the preferred embodiment, particulate material 3 is gravity fed to and through injector head 10.

However, various types of force fed techniques could be used to move particulate matter through the injector head.

As a result of this invention, particulate matter can be coated at an incredibly high rate of speed, in a very compact injector head. Sand, for example can be reliably coated with dust suppressant at rates of from about 8 to 30 tons per minute, or 500 to 2000 tons per hour. Fugitive mist is prevented from escaping into the work environment, as typically occurs when spraying particulate matter as it passes over the end of a conveyor. The buildup of clumps in the coating process is minimized. It is easy to access, clean and repair components within injector head 10. In fact, splitter bars 20 and nozzles 30 can be removed, cleaned and serviced from outside of injector head 10, even while particulate matter is flowing through the head. Splitter bars can be adjusted inwardly or outwardly while particulate matter is flowing through head 10.

Of course, it is understood that the forgoing is a description of the preferred embodiments of the invention, and that various changes and alterations can be made without departing from the spirit and broader aspects of the invention as set forth in the appended claims.

The invention claimed is:

1. An injector head for coating a particulate material while delivering the particulate material from a feeder source to a receiver;

said injector head including: a sidewall or walls defining a chute which circumscribes an interior space through which the particulate material flows, said chute having an open top and an open bottom, both circumscribed by said sidewall or walls; a centerline which extends vertically through the interior space and a middle of the injector head;

a plurality of splitter bars, each of said plurality of splitter bars having a top, sides, a first end, a second end, a bottom, and a length extending from the first end of each of the splitter bars to the second of each of the splitter bars, said plurality of splitter bars provided for dividing flow of the particulate material passing through said chute, such that the flow of the particulate material flows past and forms curtains of the particulate material to either side of each said splitter bar;

and a plurality of spray nozzles for spray coating the particulate material;

said splitter bars extending laterally from said sidewall or walls into said interior space through which the particulate material flows; each of said spray nozzles being mounted to said sidewall or walls directly below one of said splitter bars, for spraying coating material away from said sidewall or walls and laterally relative to the length of said splitter bars into the interior space of each side of said splitter bar towards the centerline of the injector head so as to coat the particulate material as the particulate material passes over to the sides of said splitter bars; each of said splitter bars is mounted to the sidewall or walls at the first end of the splitter bar and the length of each said splitter bars terminates before the middle of the injector head with an open space extending between the middle of the injector head to the second end of each of said splitter bars; wherein the length of each splitter bar extends inward towards the centerline of the injector head and the second end of each of the splitter bars is separated from the second end of an adjacent splitter bar by the open space extending from the middle of the injector head;

each of said splitter bars having a width sufficient to create a space between said curtains of particulate material flowing over and to the sides of said splitter bar, and the particulate material which has been coated collects in the receiver located below said open bottom of said chute.

2. The injector head of claim 1 in which said chute cross section size is appropriate for the volume of particulate material to be fed through said chute in a given amount of time.

3. The injector head of claim 2 in which said chute has a cross sectional width, of about 6 to 24 inches.

4. The injector head of claim 3 in which said chute is from about 4 inches to about 48 inches in length.

5. The injector head of claim 4 in which said chute is cylindrical in configuration.

6. The injector head of claim 5 in which said sidewall is coated with a wear resistant coating.

7. The injector head of claim 1 in which said injector head is an independent unit which can be attached to any feeder source, or to a chute projecting from the feeder source.

8. The injector head of claim 1 in which different ones of said splitter bars or different sets of said splitter bars project inwardly from said sidewall(s) to different distances.

9. The injector head of claim 8 in which those of said splitter bars which extend inwardly the furthest extend about to the middle of said chute; and those which extend the shortest distance extend sufficiently far to cover said spray nozzles positioned under them.

10. The injector head of claim 9 in which said splitter bars which extend inwardly the shortest distance from sidewall extend inwardly from about 1 to 3 inches, and the difference in length between different ones or different sets of splitter bars is about 1 to 3 inches.

11. The injector head of claim 8 in which said splitter bars are mounted at different levels within injector head, and are staggered relative to one another such that no splitter bar is located directly above or directly below another splitter bar.

12. The injector head of claim 11 in which the number of said splitter bars varies as a function of the diameter or width of said injector head, and the distance "d" between adjacent splitter bars in vertical plan view, said distance "d" being such that no particles pass through said chute at a distance of more than about 2 inches from a splitter bar.

13. The injector head of claim 12 in which the plan view separation d between adjacent splitter bars at their bases where they extend from said sidewall(s) is from about 1 to 4 inches.

14. The injector head of claim 1 in which each said splitter bar has a width of from about ½ to about 1½ inches.

15. The injector head of claim 1 in which said splitter bars are of circular cross section.

16. The injector head of claim 1 in which each said spray nozzle is positioned a distance below its associated splitter bar to minimize the extent to which coating material is inadvertently sprayed onto the underside of said splitter bar, but not so far below that it is located at or below a point at which said curtains of said particulate material flowing past said sides of said splitter bar begin to reunite.

17. The injector head of claim 1 in which each said spray nozzle is located from about ½ inch to about 6 inches below its associated splitter bar.

18. The injector head of claim 1 in which said spray nozzles have a wide fan spray arc, and spray in an arc which encompasses from about 70 to 110°.

19. The injector head of claim 1 in which said splitter bars are slidably mounted in said sidewall(s) so that the distance to which the splitter bars extend into said chute can be adjusted, and can be moved out of the way of the flow of the particulate material when coating is not required.

20. The injector head of claim 1 in which holders for said splitter bars are located on said sidewall or walls to the outside of said chute; said splitter bars being slidably located in said holders such that each said splitter bar has an outer end positioned on the outside of said injection head; each said splitter bar having an adjustment chain secured at one end to said holder and at the other end to said outer end of splitter bar; each said holder including a yoke for receiving a link in said adjustment chain, whereby the extent to which said splitter bar can be slid into injector head can be limited by placing a particular chain link in said yoke which effectively shortens the length of chain available to allow said splitter bar to be slid into the interior of said injector head.

21. The injector head of claim 1 in which said splitter bars are heated.

22. The injector head of claim 1 in which mixing bars project inwardly from said sidewall(s) at a level located below the level of splitter bars and nozzles in order to cause further mixing and transfer of coating material from coated to uncoated or less coated particles.

23. The injector head of claim 1 in which said mixing bars are configured in cross section to provide a top surface which slopes from one side of the bar towards the other.

24. The injector head of claim 1 in which said slope is from about 30 to about 60° relative to a lateral plane through said injector head.

25. The injector head of claim 24 in which said mixing bars slope in the same direction.

26. The injector head of claim 25 in which some of said mixing bars are positioned on the same level in said chute, and others are located on a lower level in said chute; said top sloping surface of said mixing bars on one of said levels being oriented in one direction and said top sloping surface of said mixing bars on the other of said levels being oriented in the direction opposite to said one direction.

27. The injector head of claim 26 in which each said mixing bar is located off of center with respect to the splitter bar located above it, whereby only one side of the split flow of particles is diverted by said mixing bar, leaving the curtain of particulate material which pass on the other side of the splitter bar to be mixed with the particulate material spiraling it its direction from the action of the next adjacent mixing bar.

28. An injector head for coating a particulate material while delivering the particulate material from a feeder source to a receiver, said injector head including;

- a sidewall or walls defining a chute with an open top and an open bottom through which the particulate material passes;
- a centerline which extends vertically through a middle of the injector head;
- a plurality of splitter bars extending laterally from said sidewalls into an open space through which the particulate material flows; each of said splitter bars has a width, a length, sides, a first end, and a second end; said length of each of said plurality of said splitter bars extending between the first end and second of each of said plurality of said splitter bars;
- spray nozzles mounted to said sidewall or walls, each of said spray nozzles being positioned directly below one of said plurality of splitter bars, for spraying coating material in a direction away from said sidewall or walls and laterally relative to the length of said splitter bars so as to coat the particulate material as the particulate material passes and to the sides of said splitter bars;
- different ones of said splitter bars or different sets of said splitter bars project inwardly from said sidewall or walls to different distances towards the centerline of the injector head; each of said splitter bars is mounted to the sidewall or walls at the first end of the splitter bar and the length of each of said splitter bars terminates before the open space which extends from the middle of the injector head; wherein the length of each splitter bar extends inward towards the centerline of the injector head and the second end of each the splitter bars is separated from the second end of an adjacent splitter bar by the open space extending from the middle of the injector head; the width of each of said splitter bars being from about ½ inch to about 1½ inches; and the middle of the injector head consisting essentially of said open space extending from the open top of the chute to the open bottom of the chute and said open space extending at least from the second end of each of said splitter bars to the centerline of the injector head.

29. The injector head of claim 28 in which each said spray nozzle is positioned a distance of from about ½ inch to about 6 inches below its associated splitter bar.

30. The injector head of claim 29 in which said spray nozzles have a wide fan spray arc, and spray in an arc which encompasses from about 70 to 110°.

31. The injector head of claim 28 in which said splitter bars are slidably mounted in said sidewall(s) so that the distance to which the splitter bars extend into said chute can be adjusted, and can be moved out of the way of the flow of particulate material when coating is not required.

32. The injector head of claim 29 in which said splitter bars are heated.

33. The injector head of claim 31 in which mixing bars project inwardly from said sidewall(s) at a level located below the level of splitter bars and nozzles in order to cause further mixing and transfer of coating material from coated to uncoated or less coated particles.

34. The injector head of claim 30 in which said splitter bars are slidably mounted in said sidewall(s) so that the distance to which they extend into said chute can be adjusted, and can be moved out of the way of the flow of particulate material when coating is not required.

35. The injector head of claim 30 in which said splitter bars are heated.

36. The injector head of claim 30 in which mixing bars project inwardly from said sidewall(s) at a level located below the level of splitter bars and nozzles in order to cause further mixing and transfer of coating material from coated to uncoated or less coated particles.

* * * * *

UNITED STATES PATENT AND TRADEMARK OFFICE
CERTIFICATE OF CORRECTION

PATENT NO. : 9,731,304 B2
APPLICATION NO. : 14/567597
DATED : August 15, 2017
INVENTOR(S) : James L. Paris Page 1 of 1

It is certified that error appears in the above-identified patent and that said Letters Patent is hereby corrected as shown below:

In the Specification

Column 1, Line 20:
"3,991,225" should be --3,991,325--

Column 1, Line 48:
"frilly" should be --fully--

Column 2, Line 48:
"chimps" should be --clumps--

Column 2, Line 53:
"chimps" should be --clumps--

Column 6, Line 14:
"chipping" should be --dripping--

In the Claims

Column 7, Claim 1, Line 39:
After "dividing" insert --a--

Signed and Sealed this
Fifth Day of March, 2019

Andrei Iancu
*Director of the United States Patent and Trademark Office*